United States Patent [19]

Hart et al.

[11] Patent Number: 5,150,091
[45] Date of Patent: Sep. 22, 1992

[54] BUS COVER AND LUG COVER FOR A MOLDED CASE CIRCUIT BREAKER

[75] Inventors: Marshall B. Hart, Middletown; David J. Lesslie, Plainville; Andrew M. Candelora, East Haven; Michael C. Guerrette, Plymouth, all of Conn.

[73] Assignee: General Electric Company, New York, N.Y.

[21] Appl. No.: 611,204

[22] Filed: Nov. 8, 1990

[51] Int. Cl.⁵ .............................................. H01H 9/02
[52] U.S. Cl. .................................... 335/202; 200/293; 200/304; 361/363; 361/376
[58] Field of Search ....................... 335/8–10, 335/202; 361/363, 353–355, 360–361, 373, 376, 427; 200/293–305

[56] References Cited

U.S. PATENT DOCUMENTS

| | | |
|---|---|---|
| 4,461,939 | 7/1984 | Sabisch et al. ............... 200/304 |
| 4,754,162 | 6/1988 | Kondou et al. ................ 335/8 |
| 4,783,718 | 11/1988 | Raabe et al. ................. 361/363 |

OTHER PUBLICATIONS

Serial No. 546,826 entitled "Compact Molded Case Circuit Breaker with Increased Ampere Rating", filed Jun. 29, 1990, Morgan et al.

Ser. No. 599,608, filed Oct. 18, 1990, entitled "Single Branch Circuit Breaker Support", Wall, Jr.

*Primary Examiner*—Lincoln Donovan
*Attorney, Agent, or Firm*—Richard A. Menelly; Fred Jacob

[57] ABSTRACT

Molded plastic bus covers are attached to the ends of a pair of molded case circuit breakers to isolate the circuit breakers from an electrical enclosure as well as to isolate between the circuit breakers themselves when connected within the enclosure in a double-branch configuration. Molded plastic lug covers are attached to the opposite ends of a molded case circuit breaker when the circuit breaker lugs are connected to power distribution cables to electrically isolate the power cables and the circuit breaker lugs.

15 Claims, 7 Drawing Sheets

BUS COVER AND LUG COVER FOR A MOLDED CASE CIRCUIT BREAKER

BACKGROUND OF THE INVENTION

When industrial-rated circuit breakers are connected within a lighting circuit breaker panelboard enclosure in a "double-branch" arrangement, wherein two opposedly adjacent circuit breakers are connected to the same branch strap, some means must be employed to prevent the exhaust gases emanating from one of the circuit breakers during an intense overcurrent fault from entering the opposing circuit breaker and causing a phase-to-phase fault within the panelboard enclosure. A double-branch arrangement of circuit breakers within a panelboard enclosure is described, for example, in U.S. Pat. No. 4,783,718 entitled "Lighting Circuit Breaker Panelboard Modular Assembly". When the circuit breakers are double-branch connected within the panelboard enclosure, additional electrical insulation is provided between the ends of the circuit breakers and the interior side walls of the enclosure to prevent a phase-to-ground fault caused by electrical circuit between the exhaust arc gases and the grounded enclosure.

When the circuit breakers are connected in a single branch arrangement whereby each circuit breaker is connected to a separate branch strap within an electrical enclosure, the line and load lugs on opposite sides of the circuit breakers are connected with the corresponding electrical power distribution cables. A unitary plastic support for a single branch circuit breaker arrangement is described within U.S. patent application Ser. No. 599,608 entitled "Single Branch Circuit Breaker Support". An insulative lug cover must be arranged over both ends of the circuit breakers to prevent inadvertent electrical contact.

One such lug cover is described for example, in U.S. patent application Ser. No. 546,826 filed Jun. 29, 1990 and entitled "Compact Molded Case Circuit Breaker with Increased Ampere Rating". The lug covers described therein, cooperate with an additional extension provided on the ends of the circuit breaker to mechanically support the lug covers.

It would be economically advantageous, to provide bus covers and lug covers for molded case industrial-rated circuit breakers which require no additional fastening means for holding the lug and bus covers to the circuit breaker enclosure. Accordingly, one purpose of the invention is to describe both lug and bus covers for industrial-rated circuit breakers which are economically feasible for both factory as well as field-installation.

SUMMARY OF THE INVENTION

Lug covers comprising an integrally-formed baffle and retention arrangement are attached to opposite ends of an industrial-rated circuit breaker in a press-fit relation to electrically isolate the circuit breaker line and load straps as attached to the power distribution bus bars. The invention also relates to lug covers having retention and baffle means integrally-formed therein and arranged for connection to opposite ends of industrial-rated circuit breakers to electrically isolate the circuit breaker line and load lugs as attached to the power distribution cables.

DESCRIPTION OF THE PREFERRED EMBODIMENT

Figure 1:
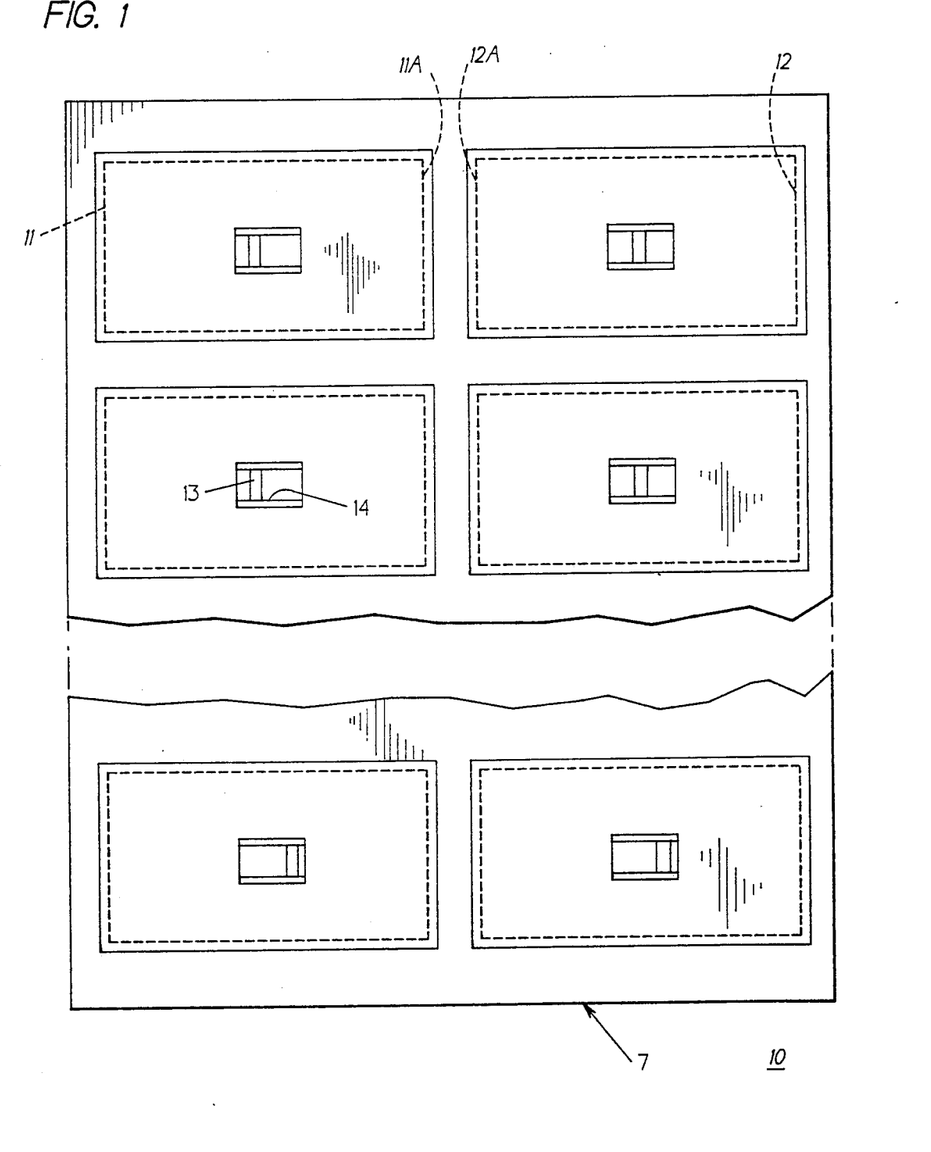
FIG. 1 is a front plan view of a lighting panelboard containing circuit breakers and bus covers in accordance with the invention.

A lighting panelboard enclosure 10 of the type described within U.S. Pat. No. 4,783,718 is shown in FIG. 1 and contains a pair of circuit breakers 11, 12 connected in a double-branch configuration wherein the line ends 11A, 12A of the respective circuit breakers are both connected to the same branch strap supported within the panelboard enclosure 7. The circuit breakers are externally accessed by means of the circuit breaker handles 13 extending outwards through the slots 14 formed within the enclosure.

Figure 2:
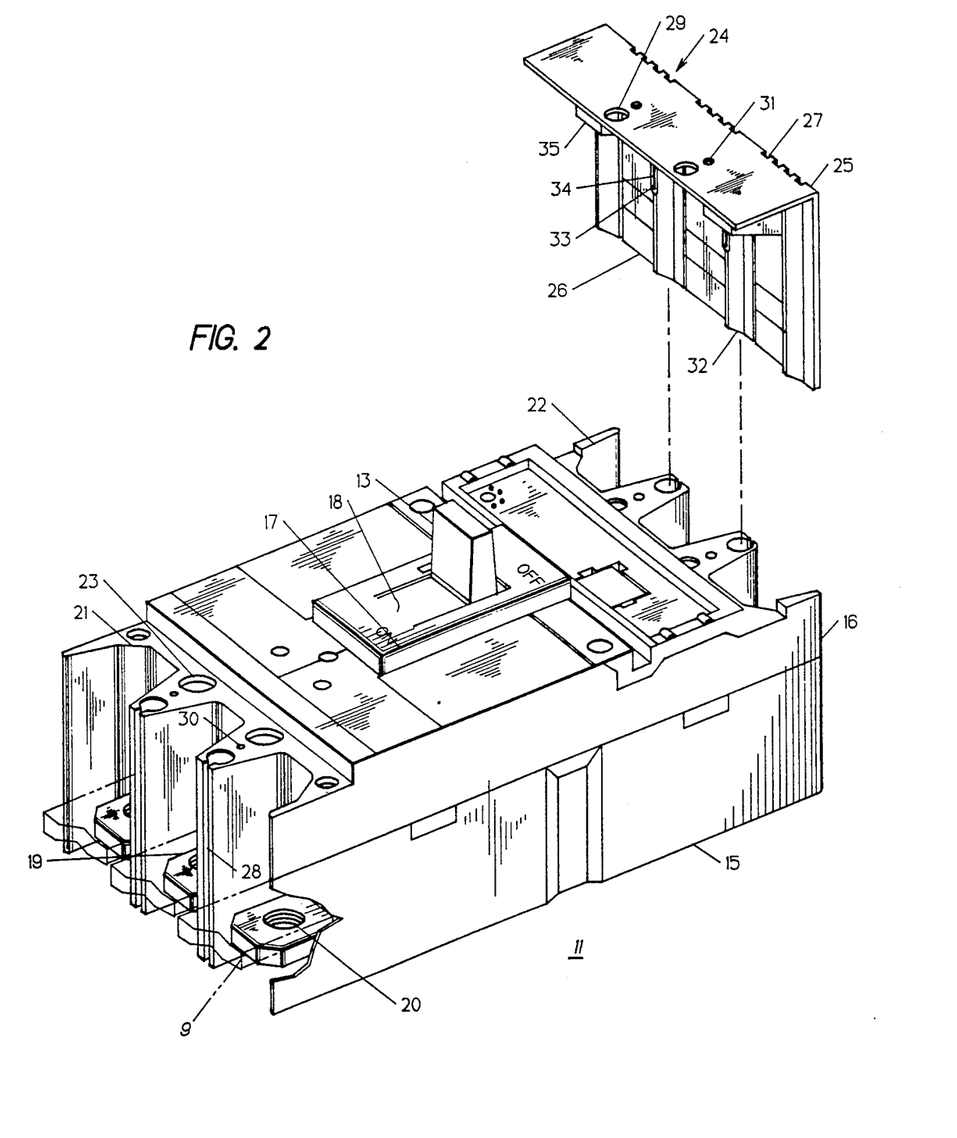
FIG. 2 is a top perspective view of a circuit breaker arranged for electrical bus bar connection with the bus cover depicted in isometric projection.

When such circuit breakers are connected within the panelboard enclosure in a double-branch configuration, the exhaust gases from one breaker experiencing a severe overcurrent fault condition in one phase of a multiphase power system should not reach the other phase connections within the opposing circuit breaker. To deter the transfer of exhaust gases between such circuit breakers, a bus cover 24 such as shown in FIG. 2 is attached to the line and load ends of the circuit breakers. The circuit breakers, one of which is depicted at 11 in FIG. 2, is industrial-rated and consists of a molded plastic case 15 to which a molded plastic cover 16 is fixedly secured. An escutcheon 17 upstanding from the cover envelopes the circuit breaker operating handle 13 which extends through the handle slot 18 formed therein. The circuit breaker is arranged within the panelboard enclosure described earlier with reference to FIG. 1 in a so-called "bus-connected" arrangement whereby the load straps 19 extending from the load end of the circuit breaker include threaded openings 20 which are arranged for electrical connection with corresponding bus bars 9, shown in phantom, which in turn connect with the industrial electrical power distribution system. Although not shown, a corresponding plurality of line straps are arranged on the opposite line end of the circuit breaker. Three trapezoidal load slots 21 arranged on the load end of the circuit breaker provide access to the load straps for providing the electrical connection.

Corresponding trapezoidal line slots 22 are arranged on the line end of the breaker for access to the line straps contained therein. The shaped elongated openings 28 arranged at both ends of the circuit breaker cover receive the bus covers in a manner to be described below in greater detail. Large thru-holes 23 arranged at opposite ends of the circuit breaker cover receive corresponding elongated mounting screws 63 (FIG. 8A) for mechanically attaching the circuit breaker to the interior of the panelboard enclosure. The smaller openings 30 receive smaller self-tapping screws that attach the bus covers to the circuit breaker cover by means of the smaller holes 31 arranged through the top 25 of the bus covers. Similar large openings 29 on the top 25 align with the openings 23 on the circuit breaker cover to provide access to the circuit breaker mounting screws. Baffles 32 integrally-formed with and extending from the back 26 of the bus cover provide additional support strength to the back while also serving to electrically isolate between the electrical phases of the electrical distribution circuit connected with the line and load straps. The bus cover is attached to the ends of the circuit breaker by inserting the baffles 32 within the shaped openings 28 and slidingly moving the bus cover downward within the shaped openings until the cylindrical shanks 33 engage the openings. Additional pressure is then applied to the bus covers to force the ribs 34 on the cylindrical shanks into a press-fit connection within the openings. This allows the circuit breaker to be transported and used in any orientation without dislodging the bus covers. The smaller holes 31 and threaded openings 30 are provided for attaching panelboard trim plates to the circuit breaker. The back wall 26 includes a plurality of elongated vent slots 27 (FIG. 3) for the directional venting of the arc gases out through the bus cover. The trapezoidal-shaped supplemental caps 35, best seen by referring now to FIGS. 3 and 3A, are configured to tightly fit within the corresponding trapezoidal-shaped load and line slots 21, 22.

Figure 3:
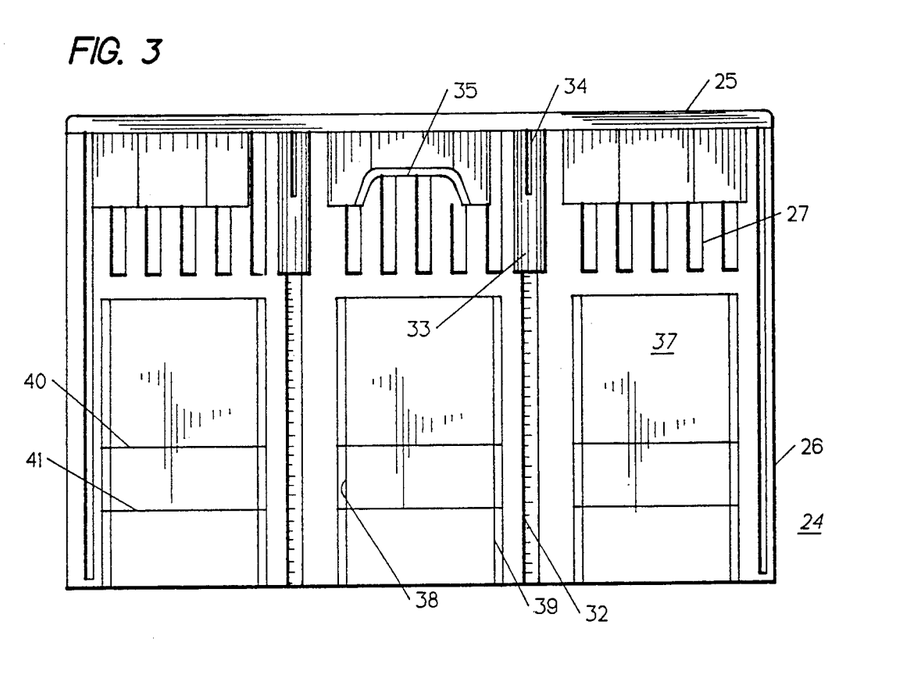
FIG. 3 is a front plan view of the bus cover of FIG. 2.
Figure 3A:
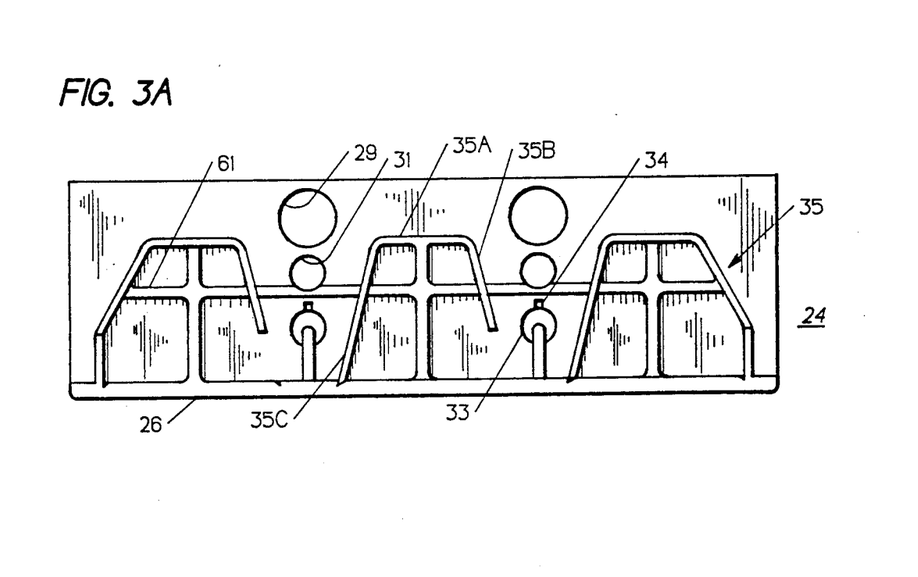
FIG. 3A is an end view of the bus cover of FIG. 3.

The bus cover 24 is depicted in FIGS. 3 and 3A with the baffles 32, cylindrical shanks 33 and ribs 34 integrally-formed therein and communicating between the back 26 and the top 25 to add further structural support to the bus cover. The elongated vent slots 27 extend parallel across the back 26 and provide controlled directional egress for the arc gases generated during the circuit interruption process. The trapezoidal supplemental caps 35 are used to provide secondary means for containing the arc gases and for directing the arc gases out through the vent slots 27 in a manner to be described below in greater detail. A series of knock-outs 37 are formed within the back 26 and include a pair of oppositely-spaced break slots 38, 39 of substantially reduced thickness compared to the thickness of the back 26. A pair of scoring lines 40, 41 allow two different sized knock-outs to be formed within the back by scribing along the knock-out lines and breaking away the area defined between the break slots by means of pliers or a similar tool. This accommodates the access of at least two different-sized bus bars 9 (FIG. 2) to be connected with the circuit breaker. The configuration of the large openings 29 and smaller holes 31 through the top of the bus cover 24 is best shown in FIG. 3A. Also shown are the trapezoidal supplemental caps 35 each formed from a projection upstanding from the top and configured as a front 35A with sides 35B and 35C extending angularly from the front. A cruciform-shaped reinforcement rib 61 is arranged between the trapezoidal supplemental caps 35 and the back 26 to allow the trapezoidal supplemental caps to exhibit flexibility while retaining integral strength in performing the gas discharge control function to be described below with particular reference to FIG. 7.

Figure 4:
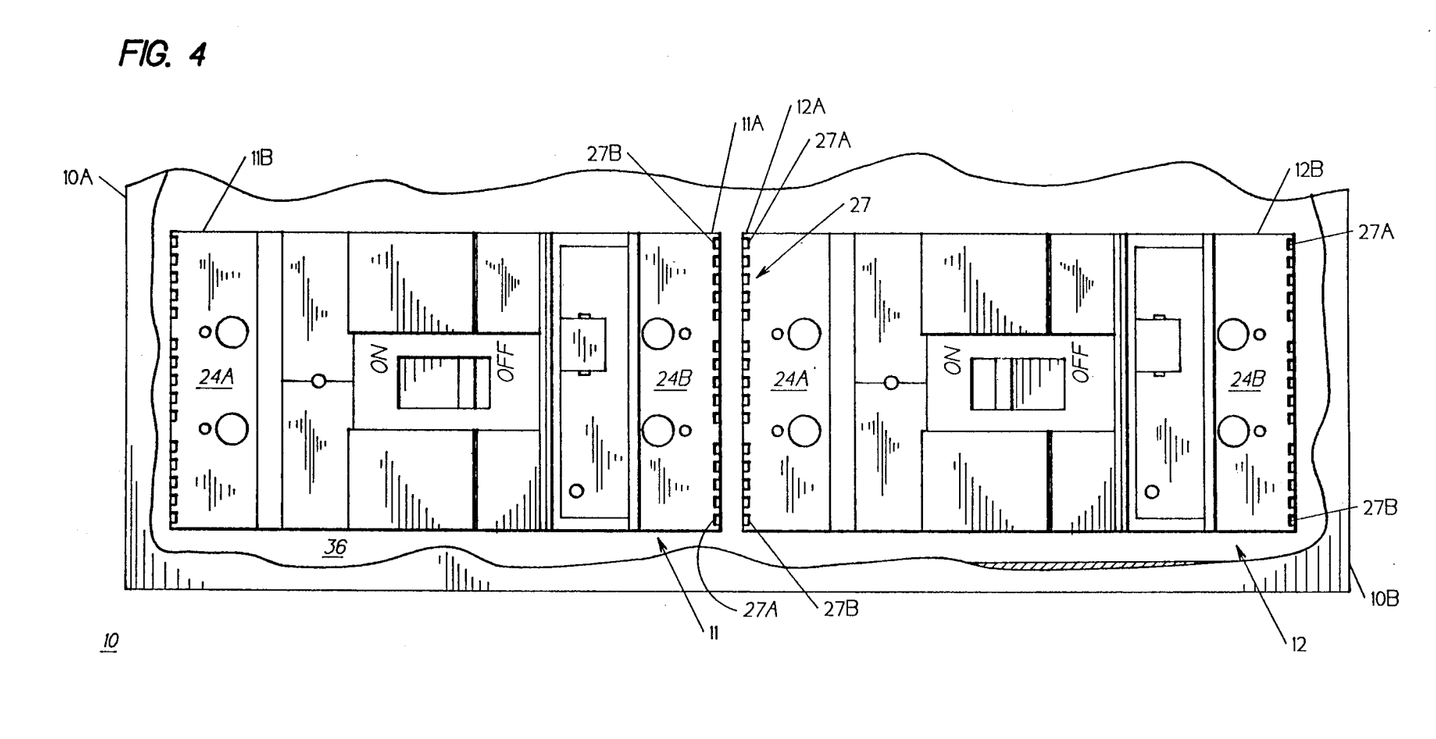
FIG. 4 is a front plan view of a part of the panelboard of FIG. 1 with the cover removed to show the arrangement of the circuit breakers and bus covers according to the invention.

The arrangement of the circuit breakers 11, 12 within the panelboard 10 is best seen by referring now to FIG. 4 wherein the line ends 11A, 12A of the respective circuit breakers are connected to the same branch strap within the panelboard interior as described earlier with reference to FIG. 1. The bus covers on the line ends of the breakers are designated 24A while the bus covers arranged on the load ends 11B, 12B of the circuit breakers are designated 24B for purposes of illustration. In forming the vent slots 27 within the bus covers 24A, 24B the vent slots are offset so that the edge of the middle slot is located on the centerline of the breaker. When two such circuit breakers 11, 12 are connected in the double-branch arrangement depicted in FIG. 4, the vent slots 27B on circuit breaker 12, for example face the vent slots 27A on circuit breaker 11 while the vent slots 27A on circuit breaker 12 face the vent slots 27B on circuit breaker 11. As indicated by arrows, the direction of flow of the exhaust gases from the two circuit breakers 11, 12 will not be in line-of-sight of the opposing vents. This is an important feature of the invention whereby the exhaust gases from one circuit breaker of a pair of double branch circuit breakers do not enter the other circuit breaker upon the occurrence of an intense overcurrent fault. The provision of the bus cover 24B on the load end of the circuit breakers provides an electrical isolation barrier between the sides 10A, 10B of the panelboards extending upwards from the back wall 36 such that no additional electrical insulation is required between the sides of the panelboard and the ends of the circuit breakers.

Figure 5:
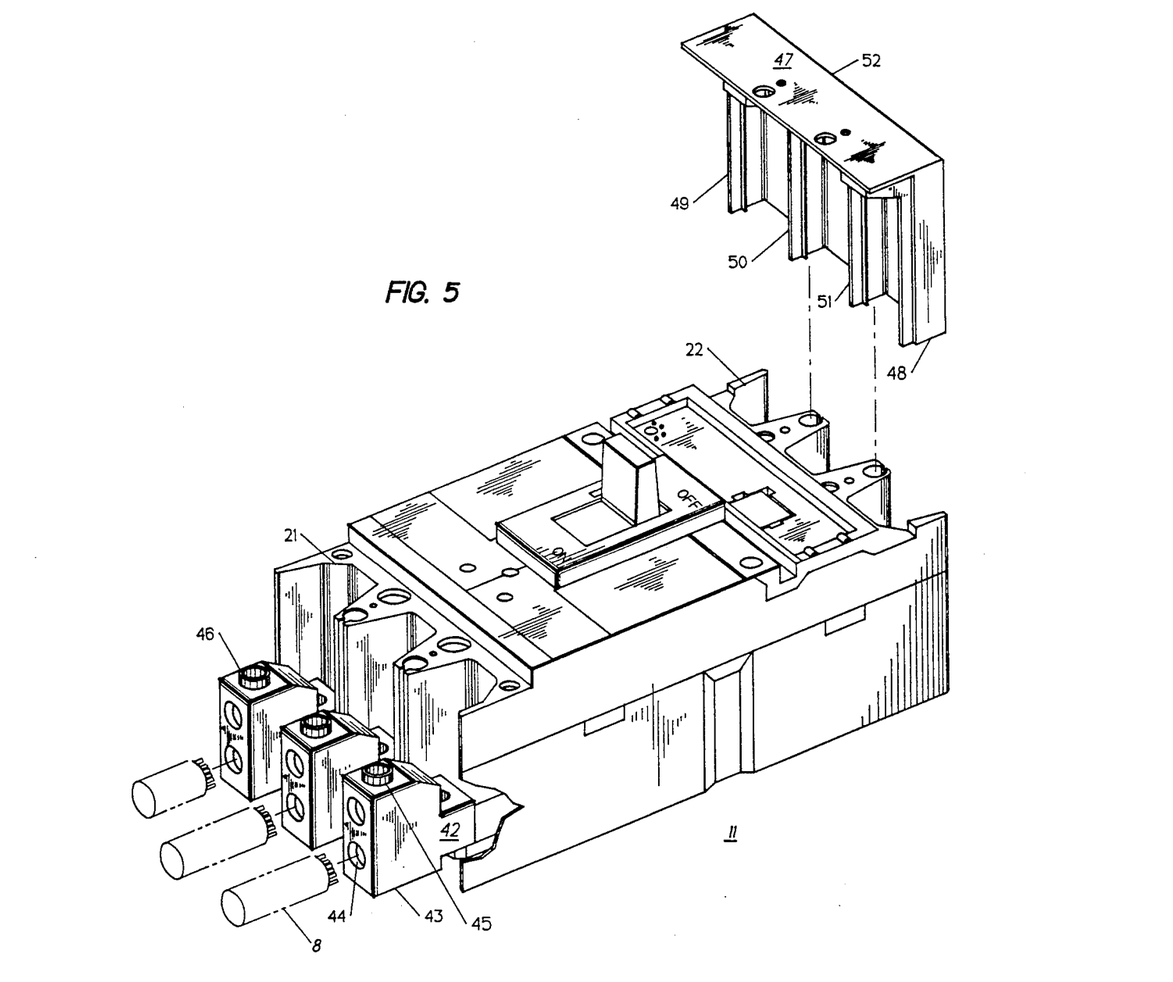
FIG. 5 is a top perspective view of a circuit breaker arranged for electrical cable connection with the lug cover depicted in isometric projection.

When a circuit breaker is connected to an electric power distribution circuit outside of a lighting panelboard enclosure, the load lugs 42 within the trapezoidal load slots 21 are connected to the load end as shown on the circuit breaker 11 in FIG. 5 to accommodate connection with the electric power distribution cables 8, indicated in phantom. The load lugs 42 include a quasi-rectangular aluminum body 43 with a pair of thru-holes 44 extending through the rear surface thereof and intercommunicating with a threaded opening 45 formed in the top surface and which includes a set screw 46 for attachment between the cables and the load lugs. A similar pair of line lugs are arranged on the line straps at the opposite end of the circuit breaker, although not shown. To electrically isolate the line and load lugs, a lug cover 47 is arranged over the trapezoidal load and line slots 21, 22 in a manner similar to that described earlier with the bus covers 24 shown in FIG. 2. The lug covers include a top part 52 integrally-formed with a pair of outer barriers 48, 49 and inner barriers 50, 51.

Figure 6:
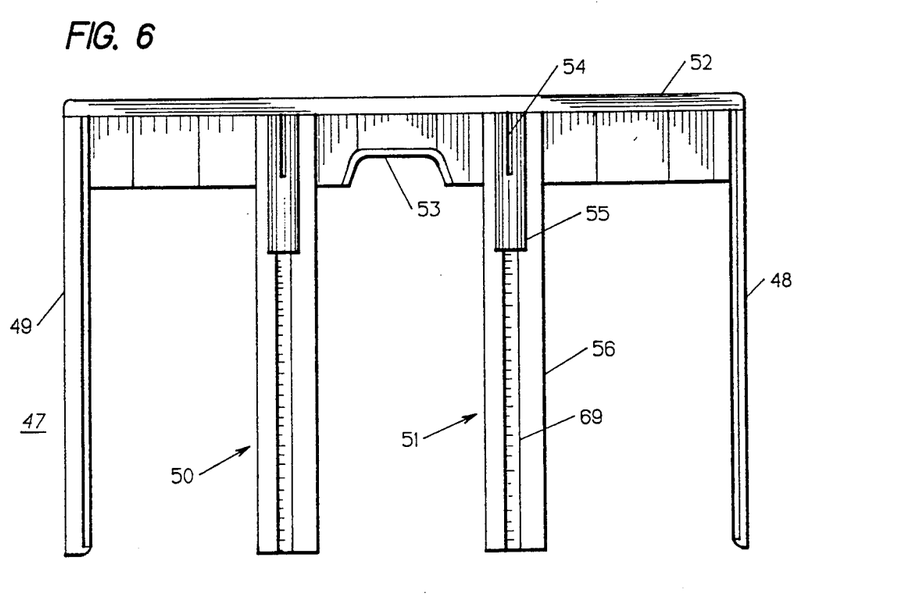
FIG. 6 is a front plan view of the lug cover of FIG. 5.
Figure 6A:
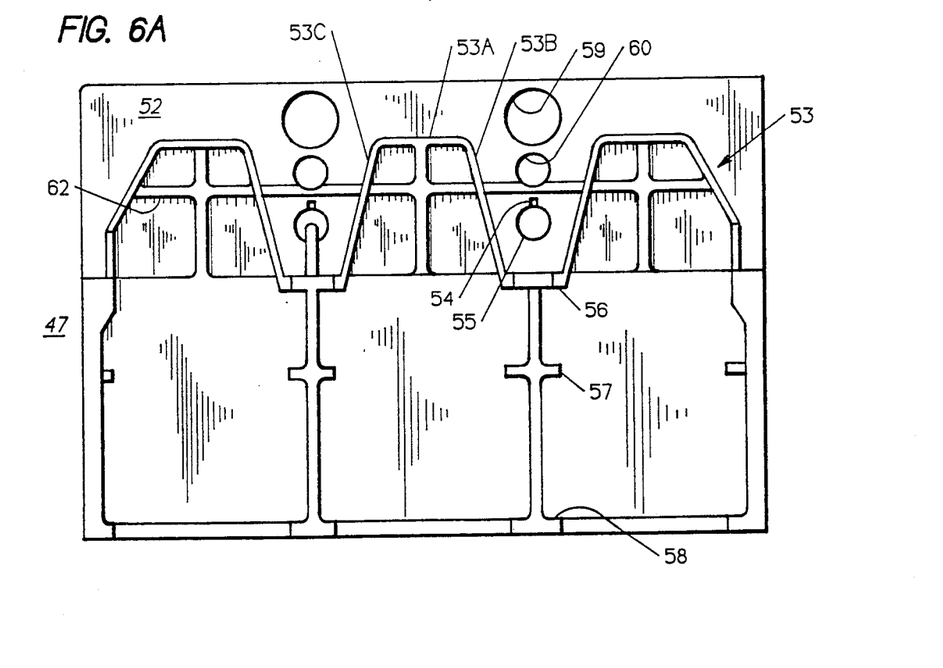
FIG. 6A is an end view of the lug cover of FIG. 6.

The configuration of the lug cover 47 is best seen by referring now to FIGS. 6, 6A where the lug cover includes integrally-formed baffles 50, 51 having cylindrical shanks 55 and ribs 54 which depend from the top 52. The inner barriers 50, 51 further include rails 56 with internal baffles 69 integrally-formed therein which rails move along the outside of the circuit breaker cover and guide the outer barriers 48, 49 and inner barriers 50, 51 when the lug cover is being attached to the circuit breaker by means of the baffles, cylindrical shanks and ribs as described earlier for the bus covers. Similar trapezoidal supplemental caps 53 as shown in FIGS. 6 and 6A project downward from the top 52 and similar large openings 59 and smaller holes 60 are formed through the top for the purposes described earlier. The cylindrical shanks 55 and extending ribs 54 provide the press-fit attachment between the lug covers 47 as described earlier for the bus covers. To allow the trapezoidal supplemental caps 53 to flex and form a tight fit connection within the trapezoidal load and line slots, similar cruciform reinforcement ribs 62 extend between the front 53A and sides 53B, 53C of the trapezoidal supplemental caps 53. A pair of reinforcement ribs 57, 58 extend from the top 52 parallel with the rails 56 for additional strength to the inner baffles 50, 51 when the lug cover is attached to the circuit breaker cover.

Figure 7:
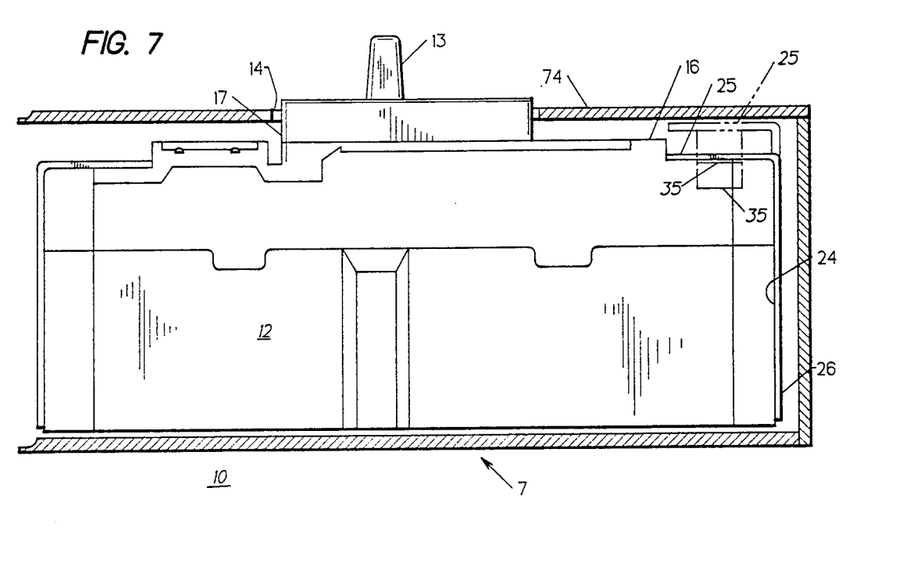
FIG. 7 is a partial cutaway side view of the panelboard of FIG. 1 depicting the bus cover of FIG. 2 attached to a circuit breaker contained therein.

The function of the trapezoidal supplemental caps 35 on the bus cover 24 when attached to the cover 16 of the circuit breaker 12 is best seen by referring now to the panelboard 10 shown in FIG. 7. The panelboard enclosure 7 includes a panelboard cover 7A which includes the slot 14 through which the circuit breaker handle 13 extends in the manner described earlier. The circuit breaker escutcheon 17 is positioned adjacent to the bottom surface of the enclosure cover 7A such that the escutcheon adjoins the panelboard cover as indicated. The top 25 of the bus cover is level with the circuit breaker cover 16 under quiescent operating conditions within the circuit breaker. When the bus cover 24 is not screwed onto the circuit breaker cover 16 and a severe fault condition occurs, the bottom part of the trapezoidal supplemental cap 35 rapidly moves from the position indicated in dotted lines to that indicated in phantom under the expansion of the exhaust gases generated when the circuit breaker responds to interrupt the circuit current. It is noted that top 25 of the bus cover stops against the inner surface of the panelboard cover as indicated in phantom while the final position of the bottom of the trapezoidal supplemental cap 35 indicated in phantom still remains below the surface of the circuit breaker cover 16 to completely restrain the exhaust gases within the bus cover 24 and to direct the exhaust gases through the vent slots arranged through the back 26 of the bus cover.

Figure 8A:
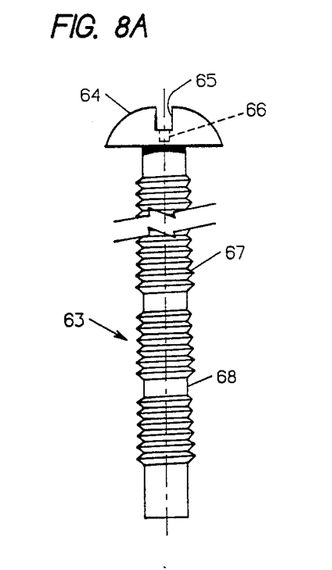
FIG. 8A is a front plan view of an adjustable length screw used with the circuit breakers shown within the preceding figures.
Figure 8B:
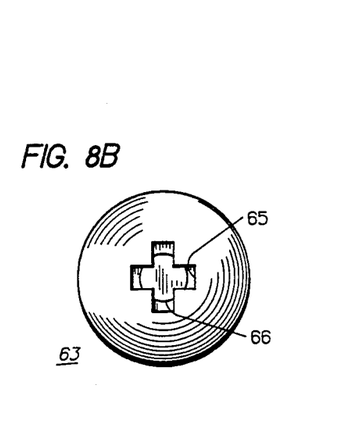
FIG. 8B is a top plan view of the adjustable length screw depicted in FIG. 8A.

A simple and economical arrangement for securing the circuit breaker 11 of FIG. 2, to a substrate support by means of the large openings 23 is provided by means of the adjustable length machine screw 63 depicted in FIGS. 8A, 8B. Since circuit breaker substrates of varying thicknesses are employed throughout the industry, several screws of different lengths are supplied by the manufacturer with each circuit breaker shipment. The adjustable length machine screw finds convenient application by providing threads 67 arranged at intervals along the length of the screw at predetermined incremental lengths corresponding to the common substrate thicknesses which are separated by unthreaded shank portions as indicated at 68. This allows the circuit breaker installer to break the adjustable screw at the correct length and discard the unused part. The round head 64 of the top of the screw, which is retained external to the opening, includes a tool slot 65 formed in the top to provide means for insertion of a screwdriver or similar tool. A threaded recess 66 formed inboard the tool slot permits the use of an additional smaller threaded screw for attaching an auxiliary device to the circuit breaker cover as is common with industrial-rated circuit breakers.

Having thus described our invention, what we claim as new and desire to secure by Letters Patent is:

1. A bus cover for molded case circuit breakers comprising:
   a plastic top part;
   a plastic back part extending perpendicular from said top part; and
   a plurality of electrical isolation barriers integrally-formed with said top and said back parts, said barriers extending co-extensive with said back part and including means formed therein for attachment to a circuit breaker cover said attachment means comprising a corresponding plurality of circular shanks integrally-formed on said barriers, said circular shanks being sized to conform to openings formed within said circuit breaker cover said circular shanks further including ribs extending from a top part thereof lockingly engaging shaped slots formed on a circuit breaker cover to thereby increase said electrical isolation.

2. The bus cover of claim 1 including a plurality of supplemental caps extending from said top part, said caps being shaped to conform to line and load slots formed within said circuit breaker cover.

3. The bus cover of claim 1 including a corresponding plurality of ribs formed on said circular shanks, said ribs fitting within said openings in a press-fit relation to hold said lug cover onto said circuit breaker cover.

4. The bus cover of claim 2 including a corresponding plurality of cruciform ribs integrally-formed on said top part and extending within said supplemental caps providing added strength to said supplemental caps.

5. The bus cover of claim 1 including a plurality of exhaust vents extending along said back part.

6. The bus cover of claim 1 including knock-out means formed on said back part.

7. The bus cover of claim 6 wherein said knock-out means comprises a pair of spaced break slots formed within said back part, said break slots being of lesser thickness than said back part.

8. A lug cover for molded case circuit breakers comprising:
   a plastic top part;
   a pair of outer electrically insulative baffles extending from said top part;
   a pair of inner electrically insulative baffles extending from said top part inboard said outer baffles;
   a pair of electrical isolation barriers on said inner baffles extending from said top part coextensive with said inner baffles, said barriers including means for attaching said lug cover to line and load ends of a molded case circuit breaker said attaching means comprising a corresponding plurality of circular shanks forms on said barrier means, said circular shanks being conformed to fit within openings formed on said circuit breaker cover, said circular shanks further including ribs extending from a top part thereof lockingly engaging shaped slots formed on a circuit breaker cover to thereby increase said electrical isolation; and
   a corresponding plurality of supplemental caps extending from a bottom surface of said top part.

9. The lug cover of claim 8 including a corresponding plurality of ribs formed on an outer surface of said circular shanks, said ribs being sized to form a press-fit relation with said openings.

10. The lug cover of claim 8 including a corresponding plurality of cruciform ribs formed within said top part and said supplemental caps providing additional strength to said supplemental caps.

11. The lug cover of claim 8 including a pair of reinforcement ribs extending from a bottom surface of said top part coextensive with said inner baffles to provide additional support to said inner baffles.

12. A bus-connected circuit breaker comprising in combination:

a molded plastic circuit breaker case and cover;

means within said case interrupting circuit current upon occurrence of an overcurrent condition through an associated electric circuit;

line straps extending from line slots formed within a line end of said case adapted for connection with said electric circuit;

load straps extending from load slots formed within a load end of said case adapted for connection with a load;

a bus cover arranged over said line or said load strips electrically-isolating said line or load straps and directing flow of exhaust gases out from said circuit breaker cover, said bus cover comprising a top part and a back part, said back part including electrical isolation barrier means arranged within openings in said circuit breaker cover to attach said bus cover to said circuit breaker cover; and a corresponding plurality of circular shanks formed on said barrier means, said circular shanks shaped to fit within said openings and including a rib formed on said circular shanks, said rib fitting within said openings in a press-fit relation to hold said bus cover to said circuit breaker cover and increase said electrical isolation.

13. The circuit breaker of claim 12 including a plurality of supplemental caps integrally-formed with said top part, said supplemental caps extending downward within said line or load slot directing said flow of exhaust gases out of said circuit breaker cover when said top part is displaced from said circuit breaker cover during said overcurrent condition.

14. A cable-connected circuit breaker comprising in combination:

a molded plastic circuit breaker case and cover;

means within said case interrupting circuit current upon occurrence of an overcurrent condition through an associated electric circuit;

line straps extending from line slots formed within a line end of said case;

load straps extending from load slots formed within a load end of said case;

line lugs attached to said line straps adapted for connection with said electric circuit;

load lugs attached to said load straps adapted for connection with said electric circuit;

a lug cover arranged within said line or load slots directing flow of exhaust gases out from said circuit breaker cover, said lug cover comprising a top part and a pair of outer baffles integrally-formed with said top part and extending within said line or load slots providing electric isolation to outer ones of said line or load lugs and a pair of inner baffles integrally-formed with said top part providing electric isolation to inner ones of said line or load lugs; and barrier means formed on said inner baffles, said barrier means including a circular shank shaped to fit within a pair of openings within said circuit breaker cover and a rib formed on an outer surface of said circular shank, said rib fitting within said openings in a press-fit relation to hold said lug cover to said circuit breaker cover and increase said electrical isolation.

15. The circuit breaker of claim 14 including a plurality of supplemental caps integrally-formed with said top part, said supplemental caps extending downward within said line or load slot directing said flow of exhaust gases out of said circuit breaker cover when said top part is displaced from said circuit breaker cover during said overcurrent condition.

* * * * *